United States Patent
Balcarczyk

(10) Patent No.: US 10,480,666 B2
(45) Date of Patent: Nov. 19, 2019

(54) BACK PRESSURE FLAP VALVE ARRANGEMENT AND THE USE THEREOF

(71) Applicant: Nederman Holding AB, Helsingborg (SE)

(72) Inventor: Piotr Balcarczyk, Bytom (PL)

(73) Assignee: Nederman Holding AB, Helsingborg (SE)

( * ) Notice: Subject to any disclaimer, the term of this patent is extended or adjusted under 35 U.S.C. 154(b) by 154 days.

(21) Appl. No.: 15/525,694

(22) PCT Filed: Nov. 3, 2015

(86) PCT No.: PCT/EP2015/075497
§ 371 (c)(1),
(2) Date: May 10, 2017

(87) PCT Pub. No.: WO2016/074975
PCT Pub. Date: May 19, 2016

(65) Prior Publication Data
US 2018/0328507 A1    Nov. 15, 2018

(30) Foreign Application Priority Data
Nov. 14, 2014 (EP) .................... 14193126

(51) Int. Cl.
*F16K 15/03* (2006.01)
*F16K 17/164* (2006.01)
*B01D 46/00* (2006.01)

(52) U.S. Cl.
CPC ........ *F16K 17/164* (2013.01); *B01D 46/0093* (2013.01); *F16K 15/03* (2013.01)

(58) Field of Classification Search
CPC ..................................................... F16K 15/03
(Continued)

(56) References Cited

U.S. PATENT DOCUMENTS

2012/0048399 A1    3/2012 Zellweger et al.
2012/0210686 A1*   8/2012 Bihlet ............ F16K 15/03
                                                    55/420

FOREIGN PATENT DOCUMENTS

CN      202691190 U      1/2013
CN      203784389 U      8/2014
(Continued)

OTHER PUBLICATIONS

Chinese Office Action dated Jul. 4, 2018, issued in corresponding Chinese Application No. 201580051491.5, filed Nov. 3, 2015, 5 pages.
(Continued)

*Primary Examiner* — P. Macade Nichols
(74) *Attorney, Agent, or Firm* — Christensen O'Connor Johnson Kindness PLLC

(57) ABSTRACT

The present invention relates to a back pressure flap valve arrangement (1) comprising a housing (2) having an inlet opening (3) and an outlet opening (4). A flap (7) is pivotably hinged about a shaft (8) extending transverse a flow direction through the housing (2). A lever (10) is rigidly connectable to the shaft (8) and forming an angle thereto. The lever (10) has a stop face (11) arranged at a distance from the connection between the lever (10) and the shaft (8) such that the stop face (11) is arranged to move along an arc shaped path when the flap (7) pivots about said shaft (8). The arrangement (1) further comprises a stopper (12) having a slot (14) having an open end (16) and a longitudinal extension along a center line (CL) of the slot (14). The stopper has a first deformation zone (19) along a first side of the slot and a second deformation zone (20) along a second side of the slot, opposite the first side of the slot. The slot (14) is arranged to receive the stop face (11) and allow the stop face (11) to move in the slot (14) in the longitudinal extension (Continued)

thereof while engaging said first and second deformation zones (19, 20).

12 Claims, 3 Drawing Sheets

(58) Field of Classification Search
USPC .......................................................... 137/527
See application file for complete search history.

(56) References Cited

FOREIGN PATENT DOCUMENTS

| | | |
|---|---|---|
| DE | 522 043 C | 3/1931 |
| DE | 3313082 A1 | 10/1984 |
| DE | 39 03 986 C2 | 8/1990 |
| DE | 20 2009 011 668 U1 | 1/2010 |
| DE | 10 2012 104 526 A1 | 11/2013 |
| EP | 2 369 209 B1 | 9/2011 |
| WO | 2010/130724 A1 | 11/2010 |
| WO | 2013/174574 A1 | 11/2013 |

OTHER PUBLICATIONS

Extended European Search Report dated Jun. 11, 2015, issued in corresponding Application No. EP14193126.1, filed Nov. 3, 2015, 4 pages.

International Search Report and Written Opinion dated Dec. 18, 2015, issued in corresponding International Application No. PCT/EP2015/075497, filed Nov. 3, 2015, 9 pages.

\* cited by examiner

BACK PRESSURE FLAP VALVE ARRANGEMENT AND THE USE THEREOF

FIELD OF THE INVENTION

The present invention relates to a back pressure flap valve arrangement and the use of such back pressure flap valve arrangement in a ducting intended to conduct a dust or particle laden gas flow.

BACKGROUND OF THE INVENTION

It is well known to collect dust particles and other particulate material in containers or the like for later disposal or use. The containers may be provided with an air filter system. The material may be supplied to the containers by means of a gaseous flow through a ducting. The dust may be explosive. In some situations, an ignition may occur in the container due to ignition sources transported to the container with the airflow or due to ignition sources inside the container. Such ignition may result in devastating effects both on personnel, buildings, and the equipment, since the ignition may cause an explosion with a pressure wave and a flame front which travels back along the ducting opposite to the normal airflow direction.

In order of preventing such pressure wave and a flame front from travelling back along the ducting, it is well known to provide a back pressure flap valve arrangement in the ducting. The back pressure flap valve arrangement typically comprises a flap which is arranged to act as a check valve which may close off the ducting. During normal operation the flap is maintained in an open position by the dust or particle laden air stream flowing along the ducting. In the occasion of sudden pressure wave resulting from an upstream explosion, the flap is arranged to close the passage through the ducting by the pressure wave acting on the flap.

To avoid any rebound of the flap it is known to use a locking mechanism. One such locking mechanism is known from DE 202009011668U1. The document discloses a housing comprising a flap that is pivotably hinged around a shaft. The shaft is hinged in the walls of the housing and is further connected to a lever arranged on the exterior of the housing. The free end of the lever is arranged to slide along a sliding surface of a locking means to accommodate pivotal movements of the flap which occur during normal operation. Should the pivoting exceed a certain angle, the free end of the lever will engage a hook in the locking means and thereby lock the flap. The locking may be manually released by releasing the engagement between the lever and the locking means.

Lately, new regulations call for solutions where the valve stays closed long enough to avoid flames from transmitting during an explosion event. A new European standard is under preparation (FprEN 16447, Title: Explosion isolation flap valves). According to the proposed standard, the parts making up the flap valve should be constructed such that it can withstand the loads imposed by any explosion that can be expected in accordance with its intended use without loosing its ability to perform its safety function.

SUMMARY OF THE INVENTION

It is an object of the present invention to provide a back pressure flap valve arrangement which allows an instantaneous closing off of the ducting in case of an adverse pressure wave exceeding a predetermined force.

The back pressure flap valve arrangement should not allow any rebound of the flap in case of such pressure wave.

Further, it should be clearly evident to the operating personnel that the back pressure flap valve arrangement has been released to highlight the necessity of an inspection of the ducting and its components.

Especially, the invention refers to a back pressure flap valve arrangement comprising a housing having an inlet opening and an outlet opening adapted for connection of the housing to a ducting, the arrangement further comprising a flap which is pivotably hinged about a shaft extending transverse a flow direction through the housing from the inlet opening to the outlet opening, and a lever rigidly connectable to the shaft and forming an angle thereto. The arrangement is characterized in that the lever has a stop face arranged at a distance from the connection between the lever and the shaft such that the stop face is arranged to move along an arc shaped path when the flap pivots about said shaft, and that the arrangement further comprises a stopper, the stopper having a slot having an open end and a longitudinal extension, and a first deformation zone along a first side of the slot and a second deformation zone along a second side of the slot, opposite the first side of the slot, and that the slot is arranged to receive the stop face and allow the stop face to move in the slot in the longitudinal extension thereof while engaging said first and second deformation zones.

By the inventive back pressure flap valve arrangement having a lever intended to interact with a stopper with deformation zones, the kinetic energy of the lever is partly transferred to and accommodated by the deformation zones of the stopper. The extremely high forces that may arise from an explosion and a pressure wave resulting there from closes the flap quickly and most of the forces result in a bounce back as the flap hits the duct end. The bounce back is mainly countered by the increased pressure created by the closed flap valve. Some of the forces are transferred to a position outside the ducting and absorbed by a controlled physical deformation of the deformation zones. The lever cannot move backward after the explosion and this results in fixation of the flap valve in a closed position such that oscillations of the air in the duct cannot re-open the flap valve.

By the lever having a stop face adapted to engage and interact with a slot having a longitudinal extension with deformation zones on opposite sides of the slot, any undue angular mismatch between the pivotal movement of the lever and the longitudinal extension of the slot may be accommodated without any substantial influence to the shaft and the flap. Accordingly, the deformation zones make the arrangement less sensitive to insufficient tolerances.

Further, by the deformation zones, it becomes very evident to the personnel that the ducting with the inventive arrangement has been subjected to an incident and that a thorough inspection of the complete system is required instead of not only replacing the stopper, or as in prior art simply unlocking the lever. This contributes to an overall secure and quality-conscious working environment.

The slot, as seen along opposite sides of the longitudinal centre line thereof, may have a symmetrical wedge shaped profile with a width which may gradually narrow as seen from the opening of the slot. The wedge shaped profile may be linear, step formed or arc shaped. By the wedge shape, the force required to move the lever with its stop face from the opening of the slot along the longitudinal extension of the slot will gradually increase while at the same time the lever will lose its kinetic energy due to the deformation of the deformation zones.

The width of the slot as seen in the opening thereof may exceed the width of the lever and its stop face.

The deformation zones, as seen along opposite sides of the longitudinal centre line of the slot, may be provided as a plurality of teeth directed towards the longitudinal centre line of the slot. The teeth will be easily deformable as compared to a slot having straight longitudinal edges, thereby contributing effectively to the loss of kinetic energy of the lever. Further, the teeth will effectively interact with the locking face and lock the same in a position when the lever has lost its kinetic energy. Thereby the flap which is indirectly connected to the lever will effectively be prevented from any rebound. The teeth may be symmetrical as seen on both sides of the longitudinal centre line.

The distance between the tips of the teeth, as seen in a direction transverse the longitudinal center line of the slot, may be gradually reduced as seen from the opening of the slot. Accordingly, the further away from the opening, the more kinetic energy will be absorbed by the teeth making up the deformation zones.

The stopper may be formed as a plate, wherein the slot is arranged in said plate.

The stopper may comprise at least two plates arranged one on top of the other and longitudinally displaced along the longitudinal centre lines of the slots, and wherein the teeth in the overlapping area are mutually displaced along the longitudinal centre lines of the slots. Thus, the teeth will form a denser pattern the further away from the opening and more kinetic energy may be absorbed from the lever.

The stopper may be arranged to be exchangeable mounted to a support, said support having an open portion along the longitudinal center line of the slot of the stopper. The mounting may be made by e.g. bolting.

The stop face may comprise a first and a second protrusion symmetrically arranged on the lever and extending transverse the longitudinal centre line of the slot. The stop face may be seen as a plowshare intended to interact with the opposite longitudinal edges of the slot, i.e. the first and the second deformation zones, ensuring a centered engagement between the lever and the slot of the stopper. Further, the protrusions may be seen as barbs which are arranged to lockably interact with the deformation zones of the stopper.

The stop face may be arranged on the aft side of the lever.

The stopper may be exchangeable.

The flap may, in a position when it closes off the inlet opening of the housing, form an angle of 3-30° to a vertical plane. The flap preferably has a resting position where it hangs essentially vertically while the inlet opening of the housing forms an acute downwardly directed angle of 3-30°. When subjected to a pressure wave which travels opposite the normal air flow direction through the ducting, the flap will pivot towards the inlet opening and close off the same. At the very same time, the lever and the stop face will lockingly engage the stopper and its deformation zones. Still, pivotal movements during normal operation will be allowed without engagement between the lever and its stop face with the stopper.

According to another aspect, the invention relates to the use of a back pressure flap valve arrangement according to any of the claims 1-12 in a duct intended to conduct a dust or particle laden gas flow.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
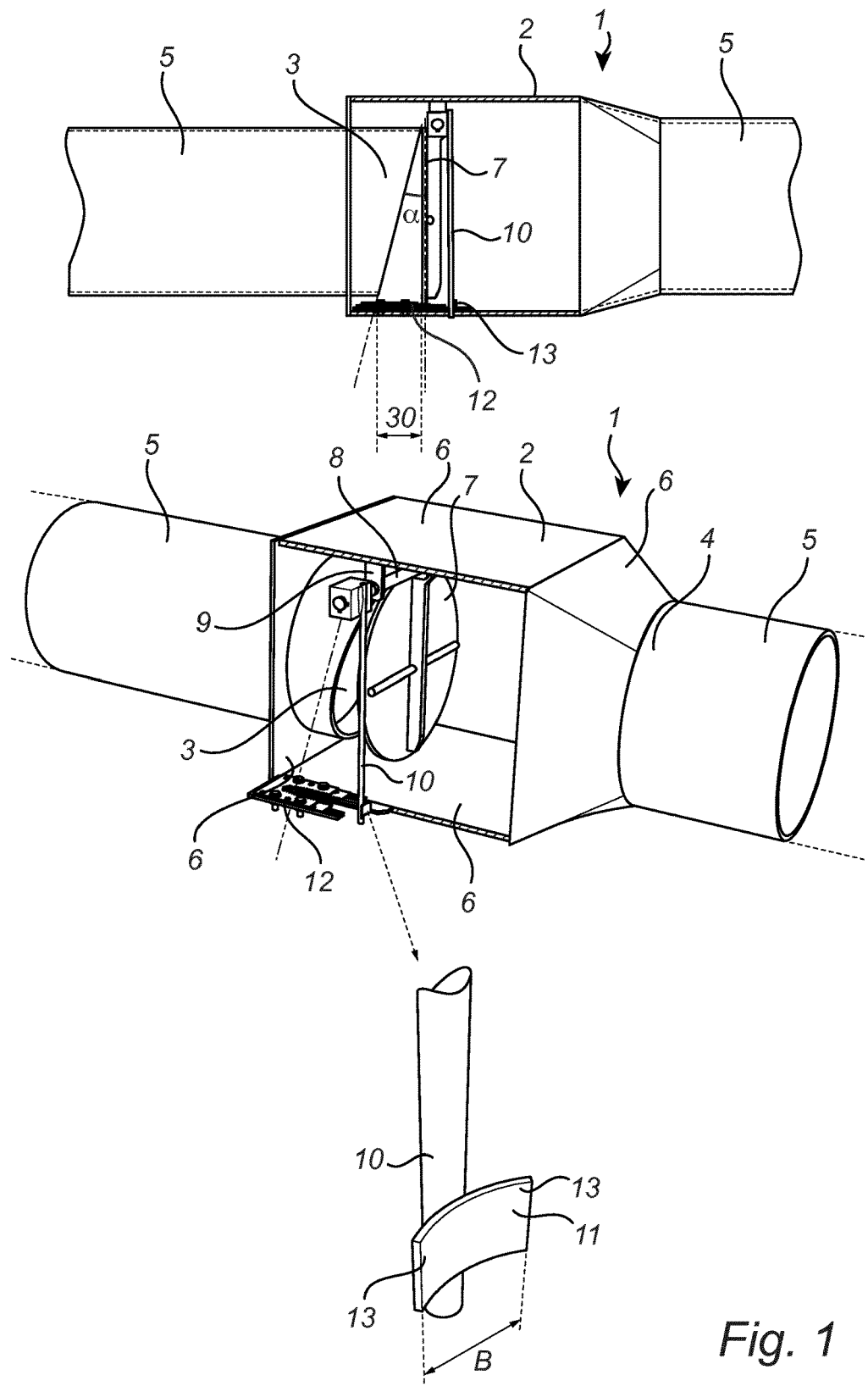
FIG. 1 discloses one embodiment of a back pressure flap valve arrangement according to the invention in a rest position.

Referring to FIG. 1 one example of a back pressure flap valve arrangement 1 is disclosed. The arrangement 1 is disclosed in its rest position, i.e. without any air flow there through.

The arrangement 1 comprises a housing 2 connected to a ducting 5. The housing 2 comprises as seen in the longitudinal extension of the ducting 5 an inlet opening 3 and an outlet opening 4. The inlet opening 3 and outlet opening 4 have a cross section corresponding to the cross section of the ducting 5. The inlet opening 3 of the housing 2 is chamfered and forms a downwardly directed acute angle α of 3-30° in view of a vertical plane.

The arrangement 1 is arranged to be connected to the ducting 5 in a position before, i.e. upstream, a container (not disclosed) such that normal process flow pass through the back pressure flap valve before it reaches the container. The container is adapted to receive a dust or particle laden fluid flow (see arrows) to be fed along the ducting. It is preferred that at least one of the walls 6 defining the housing 2 is openable (not disclosed) to gain access to the interior thereof.

The arrangement 1 further comprises adjacent the inlet opening 3 a pivotably hinged flap 7. The flap 7 is hinged along an upper portion thereof along a shaft 8 which extends transverse the flow direction through the housing 2. The shaft 8 is pivotably arranged through two opposing essentially vertical side walls 6 of the housing 2.

In a rest position, the flap 7 is arranged to extend essentially vertically. Accordingly, due to the chamfering of the inlet opening 3 of the housing 2 a horizontal gap 30 is formed between the lower end of the flap 7 and the lower end of the inlet opening 3. Pivotal movements of the flap during normal operation will thereby be allowed without the flap engaging the inlet opening.

Figure 2:
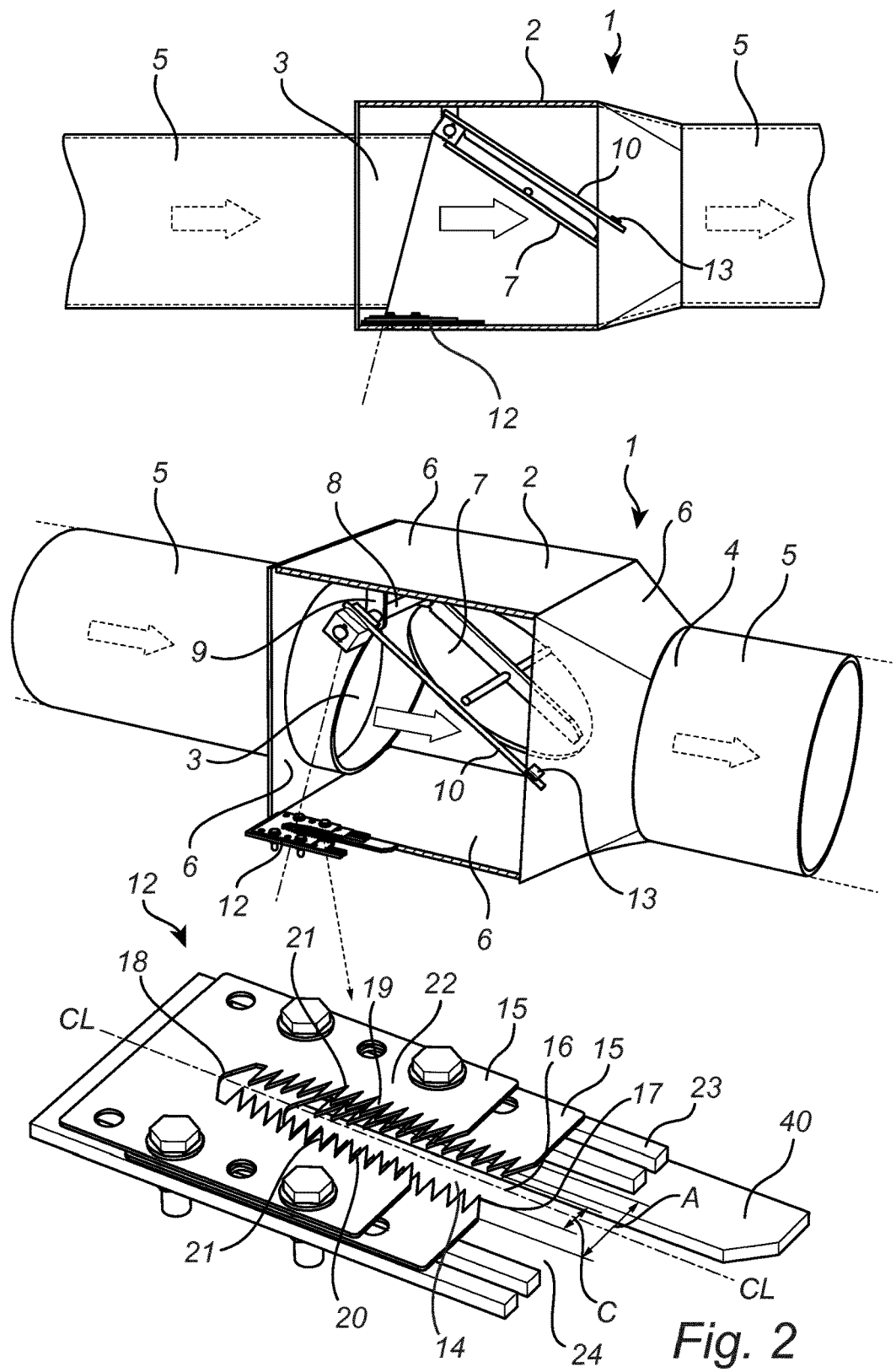
FIG. 2 discloses the back pressure flap valve arrangement during normal operation.

During normal operation, the flap 7 is arranged to be held open against gravity by the dust or particle laden air (see arrows) intended to flow through the ducting 5 as will be disclosed in FIG. 2.

The shaft 8 has a free end 9 extending to the exterior of the housing 2 via one of the vertical side walls 6. A lever 10 is rigidly connectable to the shaft 8 and forms an angle thereto. In the disclosed embodiment the lever 10 extends orthogonally to the shaft 8. However, it is to be understood that other angles are applicable. Further, it is advantageous that the lever 10, when connected to the shaft, is arranged to extend essentially in parallel with the flap 7. Thereby it will not interfere negatively with the preferred vertical rest position of the flap 7.

The lever 10 has a stop face 11 arranged at a distance from the connection between the lever 10 and the shaft 8 such that the stop face 11 is arranged to move along an arc shaped path when the flap 7 pivots about said shaft 8. Further, the lever 10 with its stop face 11 is arranged to interact with a stopper 12 (to be discussed below) during its pivoting.

The stop face 11 comprises a first and a second protrusion 13 symmetrically arranged on the lever 10 and extending transverse the longitudinal centre line CL of a slot 14 of the stopper 12. The protrusions 13 may form an angle in view of each other, together forming an angled stop face. The protrusions 13 may e.g. be formed by a piece of a flat bar welded or bolted to the free end of the lever 10. In case of bolting, the stop face 11 may easily be replaced if it should be deformed by the interaction with the stopper 12.

Now turning to FIG. 2, the stopper 12 comprises at least one plate 15 of sheet metal with a slot 14 having a straight longitudinal centre line CL with an open end 16 forming an opening 17 and a closed end 18. In the disclosed embodiment the stopper 12 comprises two plates 15 arranged one on top of the other and slightly displaced along the longitudinal center line CL. It goes without saying that the slot 14 may extend along the full length of the stopper whereby it lacks the closed end 18. Also, the number of plates 15 may vary.

The slot 14 has, as seen along opposite sides of the longitudinal centre line CL thereof, a symmetrical wedge shaped profile with a width A which gradually narrows as seen from the opening 17 of the slot 14. The width A of the slot 14, as seen in the opening 17 thereof, should exceed the width B of the stop face 11. The latter applies no matter if the stop face 11 is formed by the lever 10 as such or if the stop face 11 is formed by protrusions 13 connected to the lever 10. By the symmetrical wedge shape of the slot 14, the lever 10 with its stop face 11 may be effectively guided along the slot 14 as will be discussed below.

A first deformation zone 19 extends along a first side of the slot 14 and a second deformation zone 20 extends along a second side of the slot 14, opposite the first side of the slot. The deformation zones 19, 20, as seen along opposite sides of the longitudinal centre line CL of the slot 14, are provided as a plurality of teeth 21 directed towards the longitudinal centre line CL of the slot 14.

As a result of the wedge shaped longitudinal extension of the slot 14, a distance C between the tips of the teeth 21, as seen in a direction transverse the longitudinal center line CL of the slot 14, is gradually reduced as seen from the opening 17 of the slot.

In the disclosed embodiment two plates 15 are arranged one on top of the other and longitudinally displaced along the longitudinal centre lines CL of the slots 14 thereby forming one common slot. Also, the teeth 21 in the overlapping area 22 are mutually displaced along the longitudinal centre line CL. Accordingly, in the opening 17 of the common slot 14, the stopper 12 has a single thickness of material, whereas further away from the opening 17 in the overlapping area 22, the stopper 12 has a double thickness of material. Further, in the overlapping area 22, the teeth 21 are individually displaced, thereby providing a denser pattern and also different widths between the tips of the teeth 21.

The stopper 12 may be made by a plate 15 of steel with a uniform thickness. Since the stopper 12 is intended to be deformed by the lever 10, as will be discussed below, the stopper 12 should be easily exchangeable. This may by way of example be made by bolting the plates 15 of the stopper 12 to a fixed support 23. The support 23 is highly schematically disclosed and should be designed based on environmental conditions. The support 23 should have a very rigid design and be connected to a suitable base 40 which is highly schematically illustrated.

In order of not interfering with the lever 10 and its stop face 11 it is preferred that the support 23 is provided with an open portion 24 extending along the longitudinal center line CL of the slot 14 of the stopper 12.

During normal operation, see FIG. 2, the flap 7 is arranged to be held open against gravity by the dust or particle laden air (see arrows) intended to flow through the ducting 5.

Figure 3:
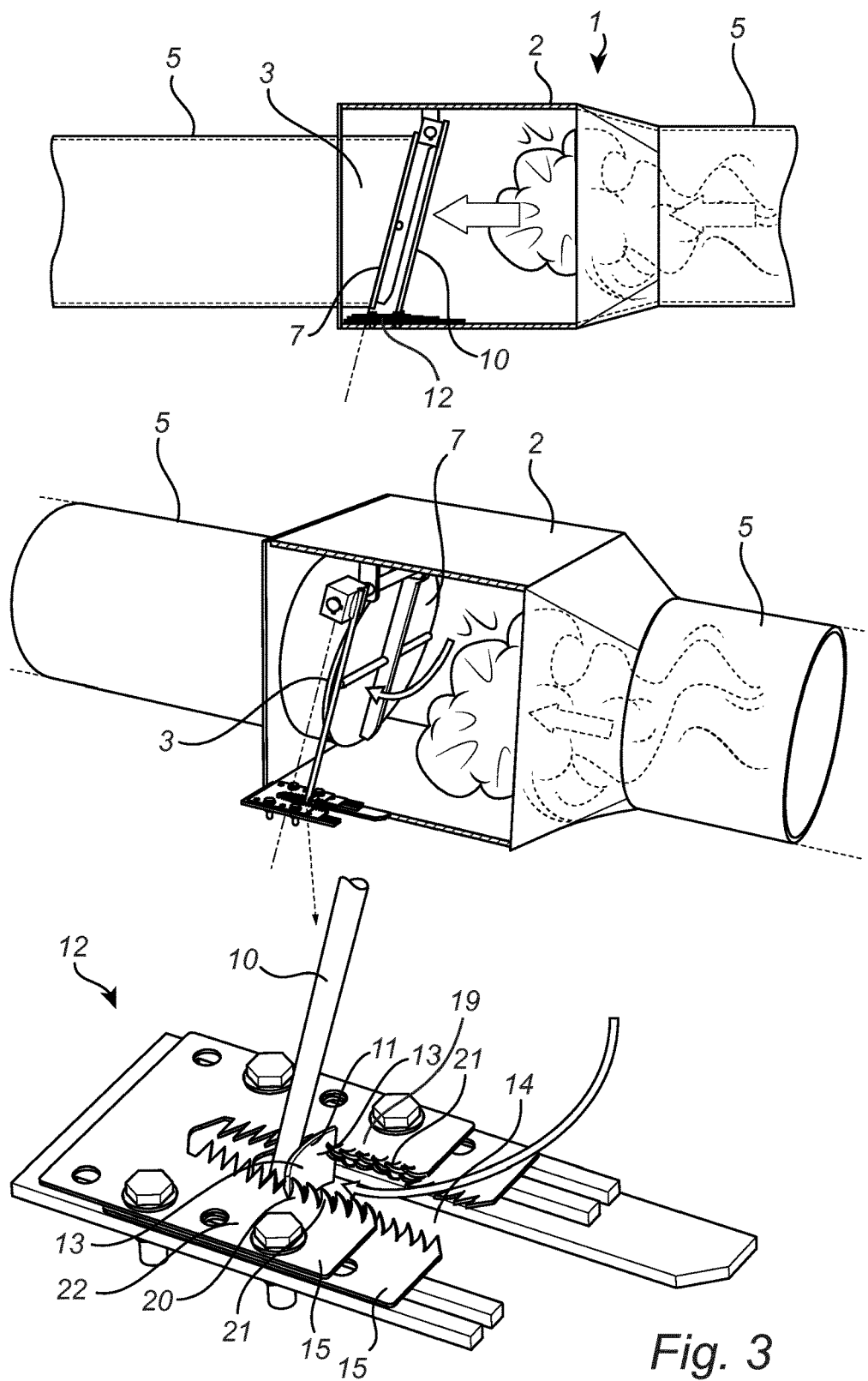
FIG. 3 discloses the arrangement of FIG. 1 when the flap has closed due to a pressure wave moving in opposite direction of the normal process flow.

Should an explosion occur downstream the housing 2, see FIG. 3, a pressure wave will result which has a direction towards the inlet opening 3 of the housing 2 (see arrows). The pressure wave will have a force exceeding the inherent energy of the dust or particle laden air flow whereby the flap 7 together with the lever 10 will pivot in an arc shaped path around the shaft 8 past the vertical plane to a position closing off the inlet opening 3.

During the pivoting the lever 10 with its stop face 11 will meet the slot 14 of the stopper 12. The kinetic energy will be absorbed by the stopper 12 and its deformation zones 19, 20 by the lever 10 with its stop face 11 travelling along the slot 14 and thereby deforming the deformation zones 19, 20. In case the deformation zones 19, 20 comprise teeth 21, these will be bent due to the deformation. The lever 10 with its stop face 11 will gradually meet an increased resistance due to the wedge shaped geometry of the slot 14 and its deformation zones 19, 20. In case of the stopper 12 comprising overlapping plates 15, the resistance will increase due to the increased thickness in the overlapping area 22 and the partially denser pattern of teeth 21.

The lever 10 will be prevented from making a return movement by the lever 10 with its stop face 11 engaging the deformation zones 19, 20 in a locking manner. In case of the stop face 11 is formed by protrusions 13, these will act as barbs engaging the deformation zones 19, 20. This is especially the case if the deformation zones 19, 20 comprise teeth 21.

By the lever 10 being prevented from making a return movement, the flap 7 is prevented to rebound when meeting the inlet opening 3 of the housing 2. Thereby it is ensured that the ducting 5 is maintained closed off in case of an accident whereby flames, sparks, smoke and the like are effectively prevented from flowing upstream the ducting 5.

The force may be very high whereby it may happen that the lever 10, the flap 7, the shaft 8 and the connection between the shaft 8 and the flap 7 may be deformed. Accordingly, to restore the function of the arrangement 1, it is likely that not only the stopper 12 but also additional components of the arrangement 1 must be exchanged.

In the paragraphs given above one preferred embodiment of the invention has been disclosed. It goes without saying that in its most simple form, the stop face 11 is formed by the exterior surface of the lever 10 as such.

The lever 10 is disclosed as a bar having a circular cross section. It is to be understood that the lever 10 may have other cross sections. In case of a non-circular cross section it may be advantageous if the lever 10 is oriented to face the stopper 12 with a corner portion of the lever 10.

The stop face 11 may be arranged on the aft side of the lever 10.

The slot 14, with or without teeth 21 may be formed by cutting. The areas outside and on opposite sides of the two deformation zones 19, 20 made by the teeth 21 may be seen as stiffening zone. The stiffening zones may be provided with reinforcements if deemed required.

In the embodiment discussed above, the stopper 12 comprises two plates 15 arranged one on top of the other with a mutual displacement along the centre line CL. It goes without saying that the number of plates may be altered and also the design of the deformation zones 19, 20. By way of example the teeth 21 may be omitted.

In the discussed embodiment, the slot has been presented as having a symmetrical wedge shaped profile with a width that gradually narrows as seen from the opening of the slot. The profile may with remained function be constituted by parallel edges, with or without teeth.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A back pressure flap valve arrangement comprising:
   a housing having an inlet opening and an outlet opening adapted for connection of the housing to a ducting;
   a flap which is pivotably mounted about a shaft extending transverse a flow direction through the housing from the inlet opening to the outlet opening;
   a lever connectable to the shaft and forming an angle thereto, the lever having a stop face arranged at a distance from the connection between the lever and the shaft such that the stop face is arranged to move along an arc shaped path when the flap pivots about said shaft;
   a stopper having a slot having an open end and a longitudinal extension along the slot, and a first deformation zone along a first side of the slot and a second deformation zone along a second side of the slot, opposite the first side of the slot, and the slot being arranged to receive the stop face and allow the stop face to move in the slot in the longitudinal extension thereof while engaging said first and second deformation zones; and
   wherein the slot, as seen along opposite sides thereof, has a symmetrical wedge shaped profile with a width which gradually narrows as seen from the opening of the slot.

2. The back pressure flap valve arrangement according to claim 1, wherein the width of the slot as seen in the opening thereof exceeds the width of the lever and its stop face.

3. The back pressure flap valve arrangement according to claim 1, wherein the deformation zones, as seen along opposite sides of the slot, are provided as a plurality of teeth directed towards the longitudinal centre of the slot.

4. The back pressure flap valve arrangement according to claim 3, wherein the distance between the tips of the teeth, as seen in a direction transverse to the length of the slot, is gradually reduced as seen from the opening of the slot.

5. The back pressure flap valve arrangement according to claim 1, in which the stopper is formed as a plate, wherein the slot is arranged in said plate.

6. The back pressure flap valve arrangement according to claim 3, wherein the stopper comprises at least two plates arranged one on top of the other and longitudinally displaced along the slot, and wherein in the teeth in the overlapping area are mutually displaced along the longitudinal centre of the slot.

7. The back pressure flap valve arrangement according to claim 1, wherein the stopper is arranged to be exchangeably mounted to a support, said support having an open portion along the slot of the stopper.

8. The back pressure flap valve arrangement according to claim 1, wherein the stop face comprises a first and a second protrusion symmetrically arranged on the lever and extending transverse to the length of the slot.

9. The back pressure flap valve arrangement according to claim 1, wherein the stop face is arranged on the aft side of the lever.

10. The back pressure flap valve according to claim 1, wherein the stopper is exchangeable.

11. The back pressure flap valve according to claim 1, wherein the flap, in a position when it closes off the inlet opening of the housing, forms an angle to a vertical plane of 3-30°.

12. Use of a back pressure flap valve arrangement according to claim 1 in a duct intended to conduct a dust or particulate laden gas flow.

* * * * *